United States Patent
Shikari et al.

(10) Patent No.: US 11,246,178 B2
(45) Date of Patent: Feb. 8, 2022

(54) BALANCING UPLINK TRANSMISSIONS FOR DUAL CONNECTIVITY

(71) Applicant: Apple Inc., Cupertino, CA (US)

(72) Inventors: Murtaza A. Shikari, Mountain View, CA (US); Sethuraman Gurumoorthy, San Jose, CA (US); Srinivasan Nimmala, San Jose, CA (US); Srirang A. Lovlekar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 16/434,558

(22) Filed: Jun. 7, 2019

(65) Prior Publication Data

US 2020/0015302 A1    Jan. 9, 2020

Related U.S. Application Data

(60) Provisional application No. 62/694,491, filed on Jul. 6, 2018.

(51) Int. Cl.
| | |
|---|---|
| *H04W 76/15* | (2018.01) |
| *H04L 12/26* | (2006.01) |
| *H04W 72/14* | (2009.01) |
| *H04W 28/06* | (2009.01) |

(52) U.S. Cl.
CPC ......... *H04W 76/15* (2018.02); *H04L 43/0864* (2013.01); *H04W 28/06* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 9,572,185 B2 | 2/2017 | Sivanesan | |
| 2011/0211471 A1* | 9/2011 | Yabe | H04L 43/0864 370/252 |
| 2018/0262950 A1* | 9/2018 | Malkamaki | H04L 1/1621 |
| 2019/0021026 A1 | 1/2019 | Iskander | |
| 2019/0098606 A1* | 3/2019 | Sharma | H04B 7/0404 |
| 2019/0386872 A1* | 12/2019 | Tang | H04W 72/12 |

FOREIGN PATENT DOCUMENTS

| | | |
|---|---|---|
| GB | 2563590 A | 12/2018 |
| WO | WO2019064204 A1 | 4/2019 |

* cited by examiner

*Primary Examiner* — Chi H Pham
*Assistant Examiner* — Raul Rivas
(74) *Attorney, Agent, or Firm* — Kowert, Hood, Munyon, Rankin & Goetzel, P.C.

(57) ABSTRACT

Techniques are disclosed relating to apportioning data between network links in dual-connectivity environments. In some embodiments, a packet data convergence protocol (PDCP) entity implemented by a mobile device determines a ratio for sending packet data to two or more different radio link control (RLC) entities implemented by the mobile device for dual connectivity communications via two or more different networks. In some embodiments, in response to a current data volume meeting a threshold value, the PDCP entity apportions packet data between the two or more different RLC entities based on the determined ratio. The ratio may be determined based on various input parameters from one or more protocol layers or may be specified by the network. In various embodiments, the disclosed techniques may improve resource utilization and reduce re-ordering delay at the receiver.

20 Claims, 17 Drawing Sheets

---

Transmit, while configured for multi-connectivity communications via two or more different networks, uplink data to a primary network until a threshold data volume has been met
*1410*

↓

Receive, from at least one of the networks, information that indicates a ratio for sending packet data to two or more different radio link control (RLC) entities implemented by the apparatus for the multi-connectivity communications, wherein ones of the two or more different RLC entities correspond to different ones of the networks
*1420*

↓

In response to data volume meeting the threshold, apportion packet data between the two or more different RLC entities based on the ratio
*1430*

↓

Wirelessly transmit the apportioned packet data to two or more different base stations
*1440*

Example use of reserves PDU types:
- 010: RTT measurement request
- 011: Interspersed DC feedback

| PDU type | Description |
|---|---|
| 000 | PCDP status report |
| 001 | Interspersed ROHC feedback |
| 010-111 | Reserved |

*FIG. 11A*

| D/C (1 bit) | PDU type (3 bits) | RTT measurement indicator (4 bits) |
|---|---|---|

*FIG. 11B*

| D/C (1 bit) | PDU type (3 bits) | RTT measurement (12 bits) |
|---|---|---|
| | RTT Measurement (cont...) | |

*FIG. 11C*

| D/C (1 bit) | PDU type (3 bits) | Reserved (4 bits) |
|---|---|---|
| | DC feedback | |

*FIG. 11D*

BALANCING UPLINK TRANSMISSIONS FOR DUAL CONNECTIVITY

CROSS-REFERENCE TO RELATED APPLICATIONS

This application claims priority to U.S. Provisional Pat. Appl. No. 62/694,491, filed Jul. 6, 2018, which is incorporated by reference herein in its entirety.

FIELD

The present application relates to wireless devices, and more particularly to techniques for selecting links for uplink transmissions using dual connectivity.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

For example, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards.

In some implementations a device may have dual connectivity to multiple different radio access networks, e.g., an LTE network and a NR network, different LTE networks, or different NR networks. In some standards, uplink data may be sent via a primary network until a threshold data volume (e.g., a ulDataSplitThreshold) is met. In some implementations various layers may be implemented, including MAC, radio link control (RLC), and packet data convergence protocol (PDCP) layers, for example. After the data volume threshold is met, the standard may not specify how to select a link for uplink data, but may specify that a mobile device should minimize the amount of PDCP protocol data units (PDUs) submitted to lower layers before receiving request from lower layers and minimize the PDCP sequence number (SN) gap between PDCP PDUs submitted to two associated RLC entities to minimize PDCP reordering delay in the receiving PDCP entity.

BRIEF DESCRIPTION OF THE DRAWINGS

A better understanding of the present subject matter can be obtained when the following detailed description of various embodiments is considered in conjunction with the following drawings, in which:

FIGS. 11A-11D are block diagrams illustrating exemplary PDU types for RTT determination at the PDCP layer, according to some embodiments.

Figure 1:
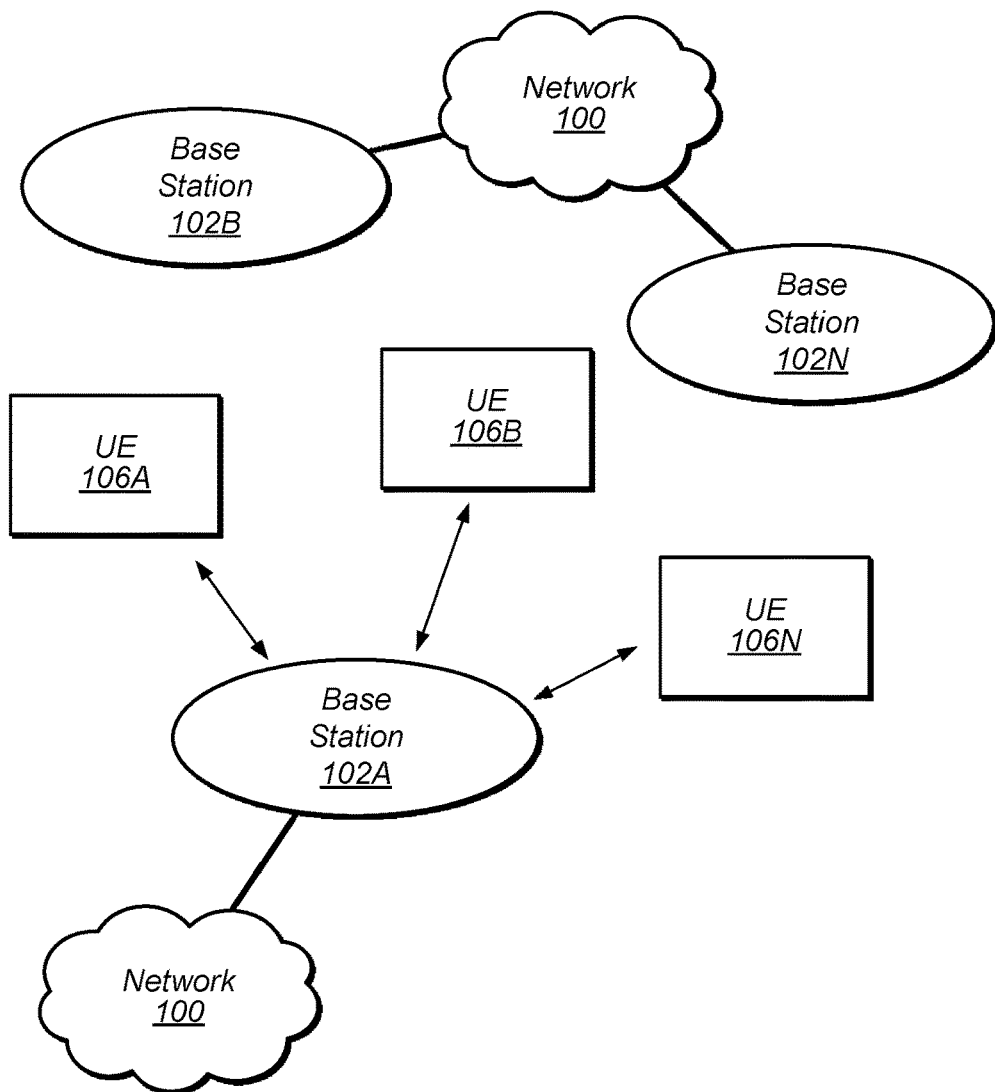
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "application processor configured to send an IP packet" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
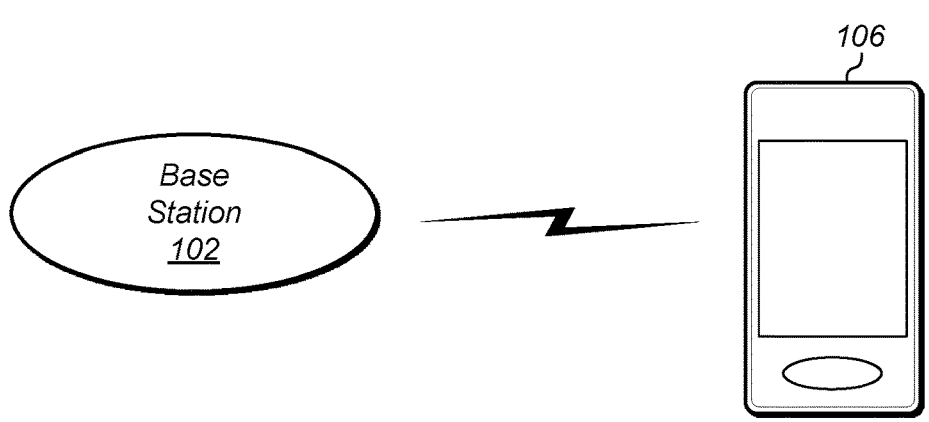
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
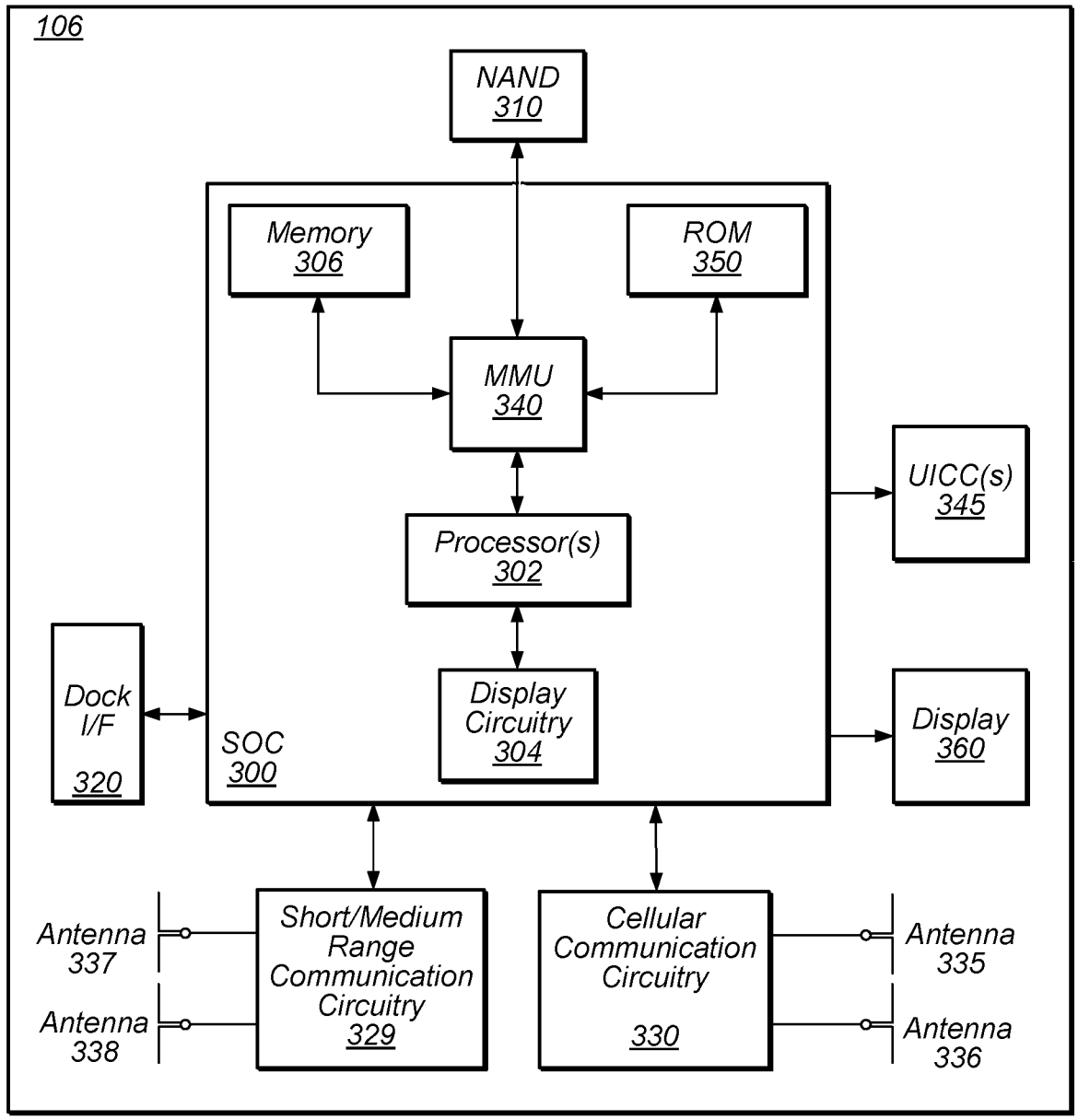
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including the communication device 106 exchanging communications with a base station to determine one or more scheduling profiles. In some embodiments, the communications with the base station to determine the one or more scheduling profiles may include exchange of one or more radio resource control (RRC) signal messages. In some embodiments, the one or more scheduling profiles may not conflict with one another. In some embodiments, a scheduling profile may specify one or more parameters associated with communication device 106 communication behavior, e.g., one or more constraints on communication device 106 communication behavior and/or slot scheduling of communication device 106 communications. In addition, the method may include the communication device 106 receiving a slot configuration schedule from the base station. The slot configuration schedule may be based on at least one scheduling profile of the one or more scheduling profiles. Further, the method may include the communication device 106 performing communications with the base station based on the at least one scheduling profile.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
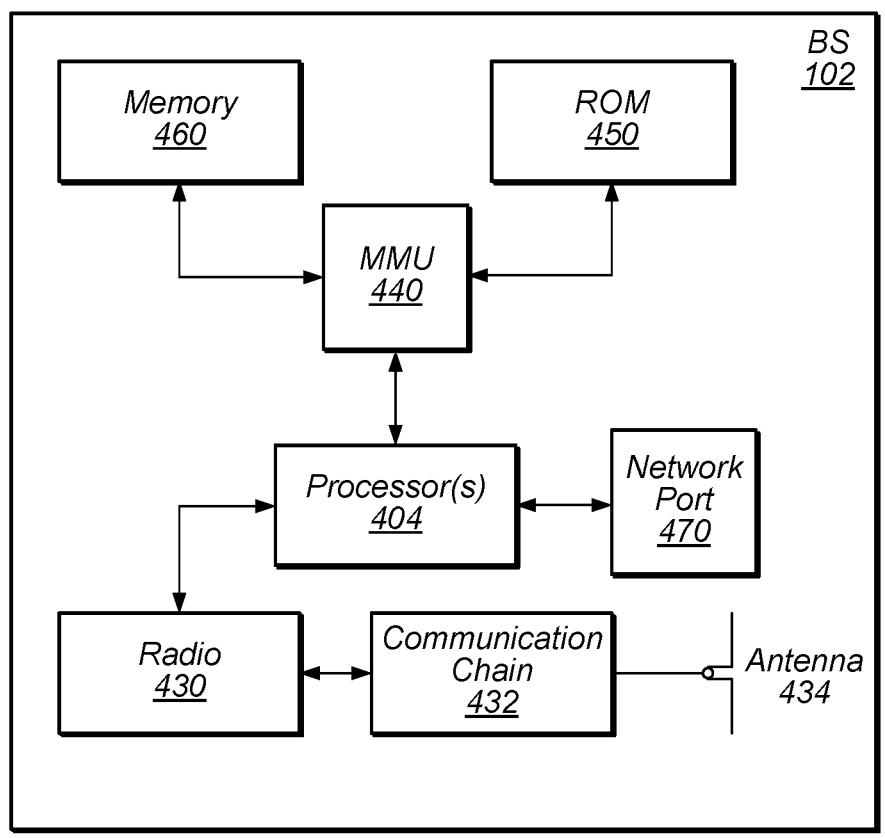
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
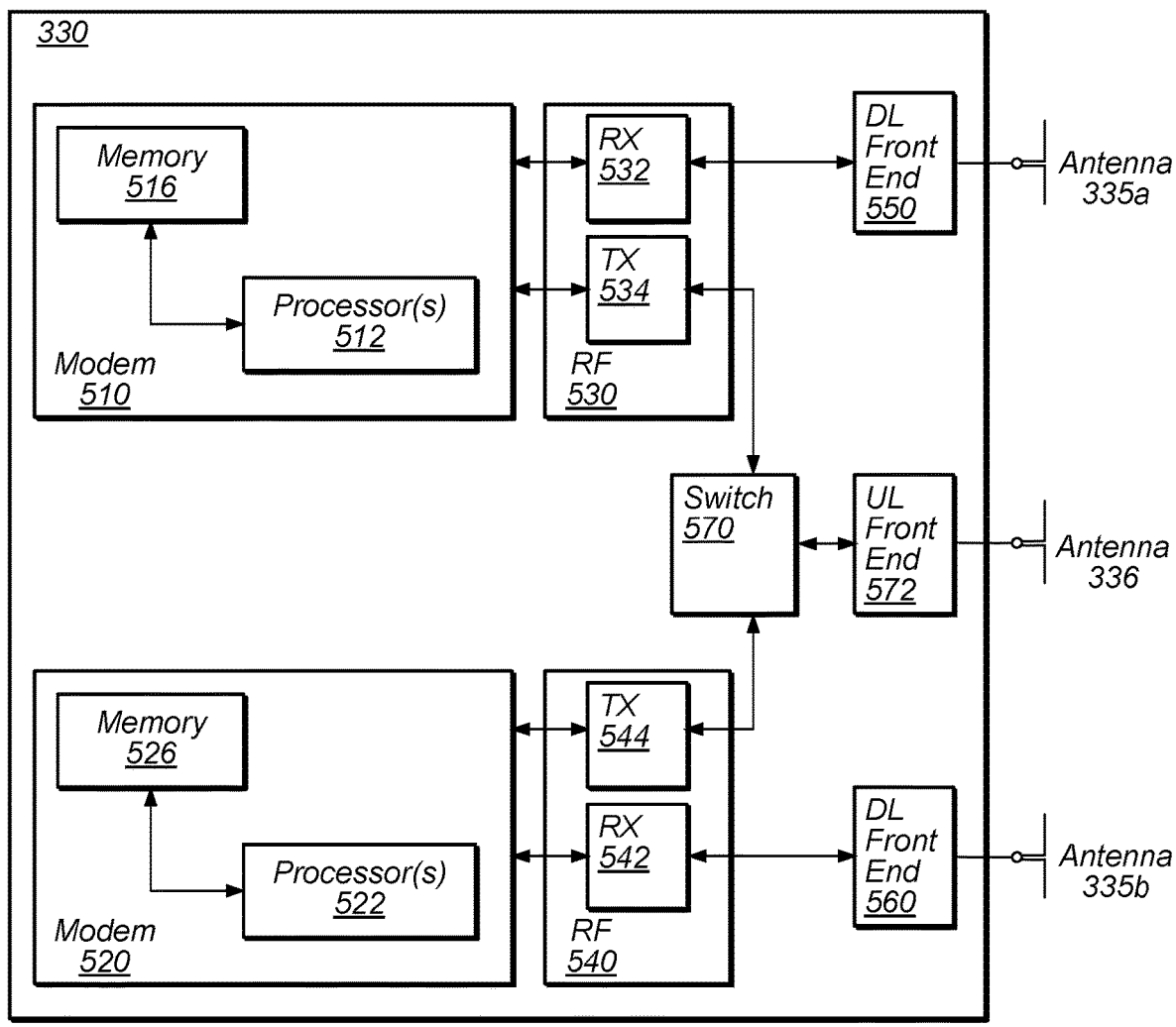
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform a method including exchanging communications with a base station to determine one or more scheduling profiles. In some embodiments, the communications with the base station to determine the one or more scheduling profiles may include exchange of one or more radio resource control (RRC) signal messages. In some embodiments, the one or more scheduling profiles may not conflict with one another. In some embodiments, a scheduling profile may specify one or more parameters associated with UE communication behavior, e.g., one or more constraints on UE communication behavior and/or slot scheduling of UE communications. In addition, the method may include receiving a slot configuration schedule from the base station. The slot configuration schedule may be based on at least one scheduling profile of the one or more scheduling profiles. Further, the method may include performing communications with the base station based on the at least one scheduling profile.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
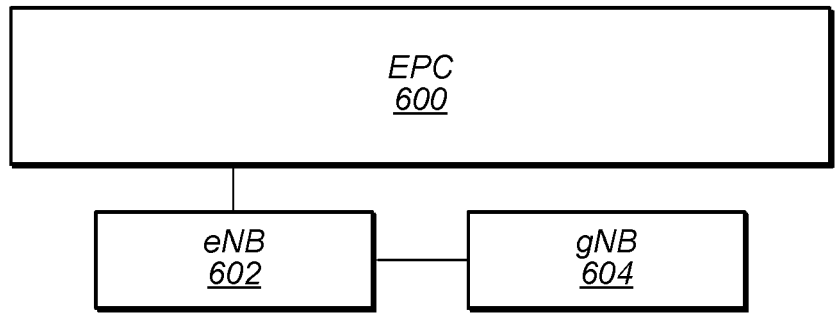
FIG. 6A illustrates an example of connections between an EPC network, an LTE base station (eNB), and a 5G NR base station (gNB).
Figure 6B:
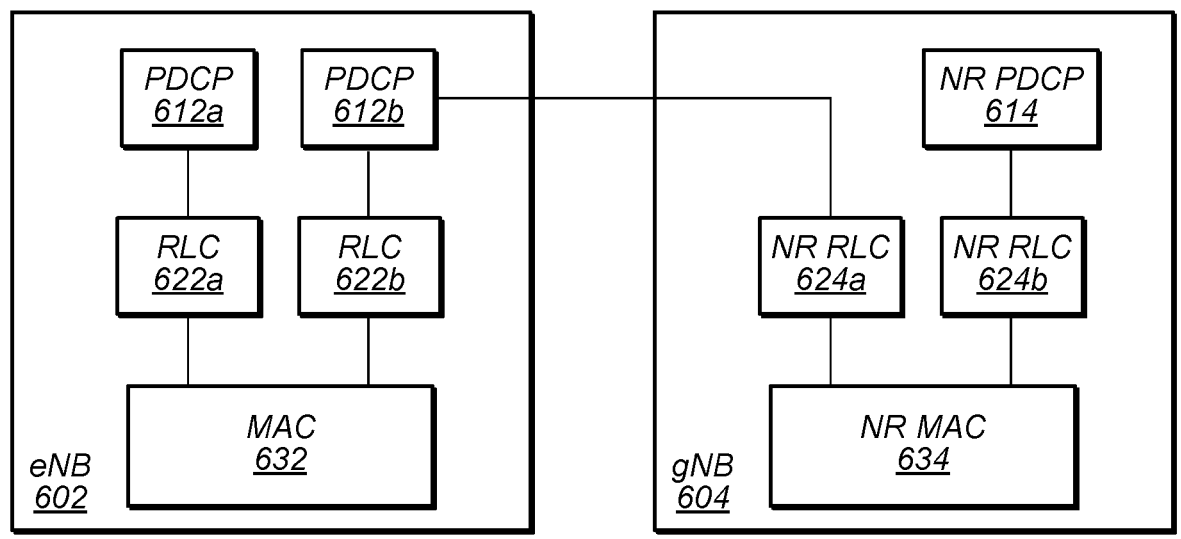
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and default user plane data and NR may be used for additional user plane data transfer. Thus, LTE may be used to establish connections to the network and to handle some data services and NR may be used for additional data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
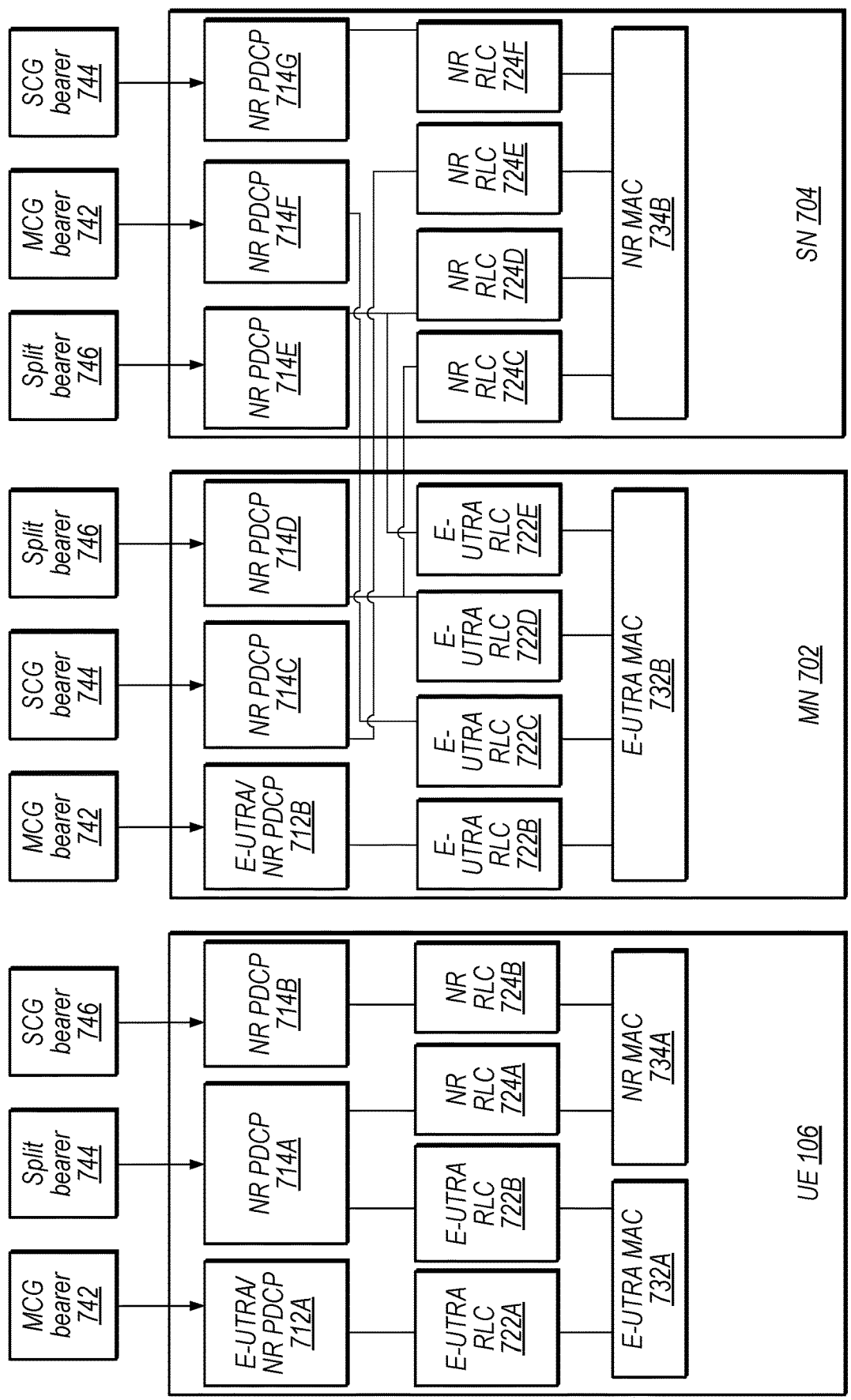
FIG. 7A illustrates a more detailed exemplary protocol stack for dual-connectivity, according to some embodiments.

FIG. 7A is a block diagram illustrating exemplary layers for dual connectivity in more detail, according to some embodiments. In the illustrated embodiment, three bearers are implemented between the UE and the master network 702 and secondary network 704: a master cell group (MCG) bearer 742, a secondary cell group (SCG) bearer 746, and a split bearer 744. In the illustrated example, the master network is an E-UTRA network and the secondary network is a NR network. In the illustrated example, the split bearer may carry for E-UTRA and NR data.

UE 106, in the illustrated embodiment, includes three PDCP modules, including an E-UTRA NR PDCP module 712A and two NR PDCP modules 714A and 714B. Similarly, each network 702 and 704 includes an NR PDCP module for each of the split bearer 744 and SCG bearer 744, while the MN 704 includes an E-UTRA NR PDCP 712B for the MCG bearer and the SN 704 includes an NR PDCP 714F for the MCG bearer.

In the illustrated embodiment, each system also includes at least one RLC module 722 for each PDCP module. Further, in the illustrated embodiment, each system includes two RLC modules corresponding to the split bearer 744.

In the illustrated embodiment, MN 702 implements an E-UTRA MAC module 732B, SN 704 implements an NR MAC module 734B, and UE 106 implements separate MAC modules for E-UTRA and NR 732A and 734A. Ones of the modules discussed herein may implement a corresponding "entity," as this term is used in NR standards documents, for example. Various illustrated modules may be implemented on the same or different processors, processor cores, circuits, computer-readable media, etc.

In some embodiments, the network specifies a ulDataSplitThreshold parameter and UE 106 is configured to submit PDCP PDUs (e.g., from NR PDCP 714A) to the primary RLC module/entity until a data volume meets this threshold. The network may specify which RLC entity is the primary entity or the primary entity may be fixed. In some embodiments, after the data volume meets the threshold, NR PDCP 714A is free to choose which RLC module to which to submit a given PDCP PDU. In some embodiments, a wireless specification may specify additional goals for this scenario, e.g., as set out in 3GPP TS 38.323 v2.0.0 (2017-12) that "[i]f the transmitting PDCP entity is associated with two RLC entities, the UE should minimize the amount of PDCP PDUs submitted to lower layers before receiving request from lower layers and minimize the PDCP SN gap between PDCP PDUs submitted to two associated RLC entities to minimize PDCP reordering delay in the receiving PDCP entity." Various techniques disclosed herein may address these goals, at least in part, to advantageously improve resource utilization and reduce re-ordering delay at the receiver (which may in turn increase throughput and/or reduce latency).

Figure 7B:
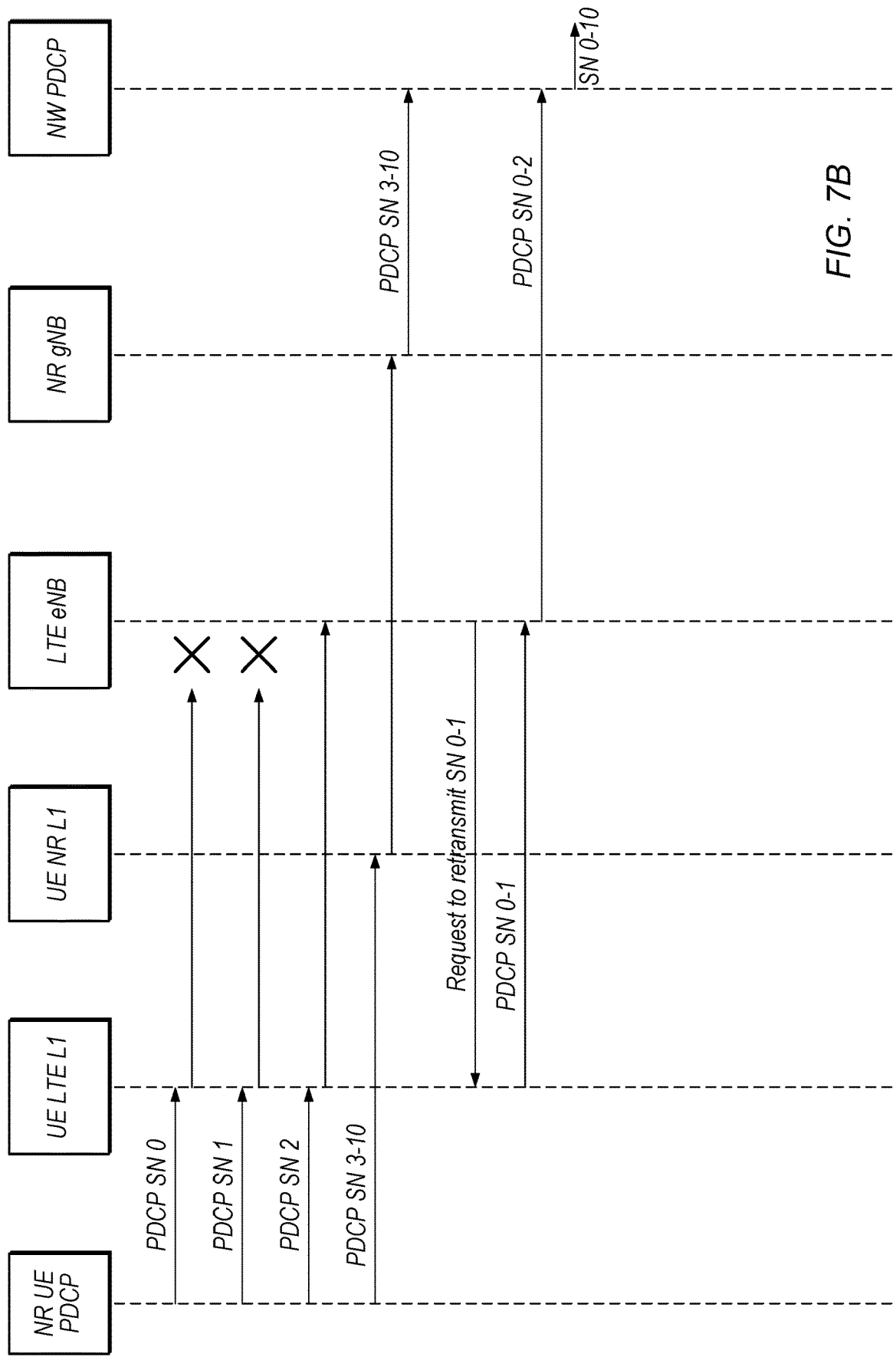
FIG. 7B illustrates the concept of an SN gap, according to some embodiments.

FIG. 7B is a communications diagram illustrating exemplary effects of an SN gap. Note that an SN gap may be quantified in various ways. One definition of the SN gap is the sum of (A) the difference between the right edge (max SN) scheduled between two networks and (B) the difference between the left edge (minimum SN) scheduled between the two networks, minus one. For example, if network A carries SNs 1-3 (minimum of one and max of three), network B carries SNs 4-10 (minimum of four and max of ten), the worst-case SN gap is (4−1)+(10−3)−1=9, e.g., when the receiving PDCP layer receives SN 1 for network A and SN 10 for network B. Restricting the maximum allowed SN gap may indirectly restrict the overall amount of SNs sent on a given network.

In the illustrated example, a NR UE PDCP entity sends sequence numbers 0-2 to the LTE L1 layer, but over-the-air transmission of SNs 0 and 1 fails. The NR UE PDCP entity also sends sequence numbers 3-10 to the NR L1 layer, and they are all successfully transmitted to the NR gNB. In this example, the SN gap may be eight.

The LTE eNB requests a retransmission of SNs 0-1 and eventually sends SNs 0-2 to the NW PDCP entity once those SNs have been retransmitted. As shown, the retransmissions delay the LTE SNs relative to the NR SNs. The NR SNs are delayed in a re-ordering buffer, such that the slower LTE link delays the faster NR link. In various embodiments, having a large SN gap may substantially slow the faster network due to re-ordering delays.

Although various embodiments disclosed herein relate to LTE and NR, the disclosed techniques may be used with various radio access networks, including multi-connectivity between LTE networks, multi-connectivity between one or more LTE networks and one or more NR networks, multi-connectivity between other types of radio access networks, etc. Further, although various dual-connectivity examples are included herein, the disclosed techniques may be used with larger numbers of connected networks.

Apportioning Data Between RLC Entities

In some embodiments, a first approach to selecting RLC entities involves maintaining a ratio of data to be routed over each RLC entity. Various ratios or apportionments discussed herein may be maintained based on number of PDUs, number of transmitted bytes, or some other appropriate granularity. In some embodiments, a second approach to selecting RLC entities involves characterizing each link and scheduling data over the different links based on the characterization (e.g., using tokens, SN gap limits, or some other scheduling technique). In some embodiments, a third approach to selecting RLC entities involves tracking an amount of SN gap between different links to improve throughput and decrease latency. Various different input factors may be utilized to determine ratios/characterizations/etc. for one or more of the approaches discussed above. In some embodiments, any of various techniques discussed herein may be used in combination to apportion data between different networks.

Figure 8:
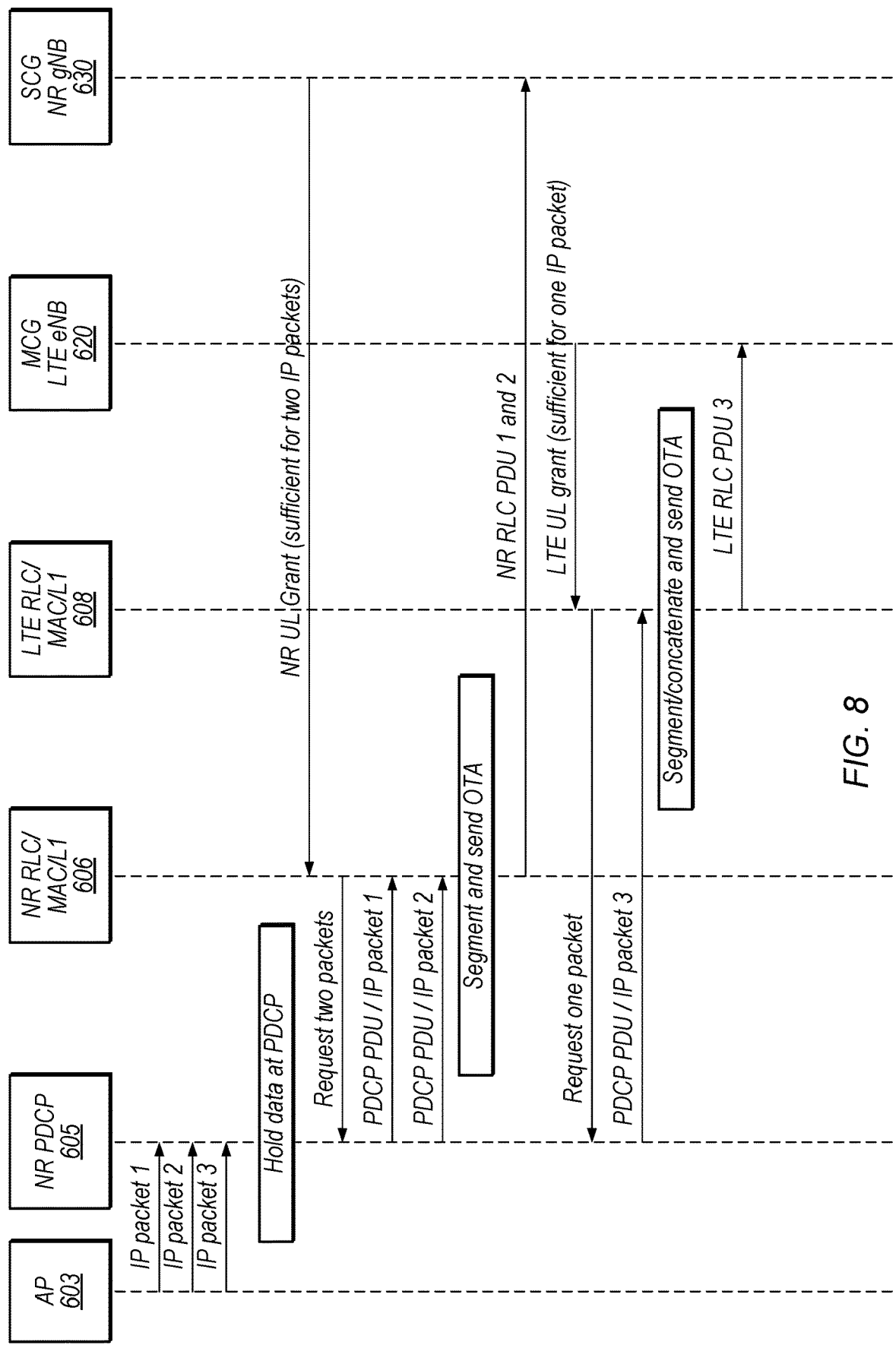
FIG. 8 is a communication diagram illustrating a technique for apportioning UL data by holding data at the PDCP layer, according to some embodiments.

FIG. 8 is a communication diagram illustrating a technique in which a UE PDCP layer is configured to hold data until a grant is available, in some embodiments. In these embodiments, the PDCP module may hold data until the RLC layer requests data from PDCP (which may be performed in response to the MAC layer determining that a grant is available and requesting the RLC layer to submit data).

In the illustrated embodiment, communications are shown between ones of application processor (AP) 603, NR PDCP entity 605, NR RLC/MAC/L1 unit 606, LTE RLC/MAC/L1 unit 608, MCB LTE eNB 620, and SCG NR gNB 630. In some elements 602-608 are implemented on UE 106. AP 603, in some embodiments, is a central processing unit configured to execute one or more applications that generate PDCP data. NR PDCP entity 605 is a module configured to send data to both NR and LTE RLC entities, in some embodiments. For example, entity 605 may correspond to NR PDCP module 714A. Unit 606, in some embodiments, includes one or more modules configured to implement RLC, MAC, and L1 layers on UE 106 for NR. Unit 608, in some embodiments, includes one or more modules configured to implement RLC, MAC, and L1 layers on UE 106 for LTE.

In the illustrated example, AP 603 sends three packets (IP packets 1-3) to NR PDCP 605, which holds the packet data at the PDCP layer until network grants are received. For example, when the NR network provides an UL grant sufficient for two IP packets and unit 606 requests two packets from PDCP, PDCP entity 605 sends PDCP PDUs for IP packets 1 and 2, when are segmented and sent over the air to the NR gNB 630. In the illustrated example, the LTE network then provides an UL grant sufficient for one IP packet and unit 606 requests data for one packet. PDCP entity 605 then sends a PDCP PDU for IP packet 4, which is segmented and/or concatenated and sent over the air to eNB 620.

These techniques may allow for a short interval between adding a sequence number for a PDCP service data unit (SDU) (e.g., received from an application processor) and scheduling transmission of the sequenced data. Therefore, a peer PDCP receiver entity may not have to hold data for re-ordering for an extended period even though data may be arriving from distinct RLC entities.

Further, in some situations, the NR PDCP entity 605 is configured to use cellular radio metrics for the different links in determining which RLC entity to target. Examples of such metrics include, without limitation: block error rate (BLER), received signal measurements such as RSRP, RSRQ, RxLev, and RSSI, UL grants, etc. For example, if one network has grants available but has a high BLER, the PDCP entity may apportion less data to that network, e.g., by waiting for a grant on the other network for one or more packets.

Figure 9:
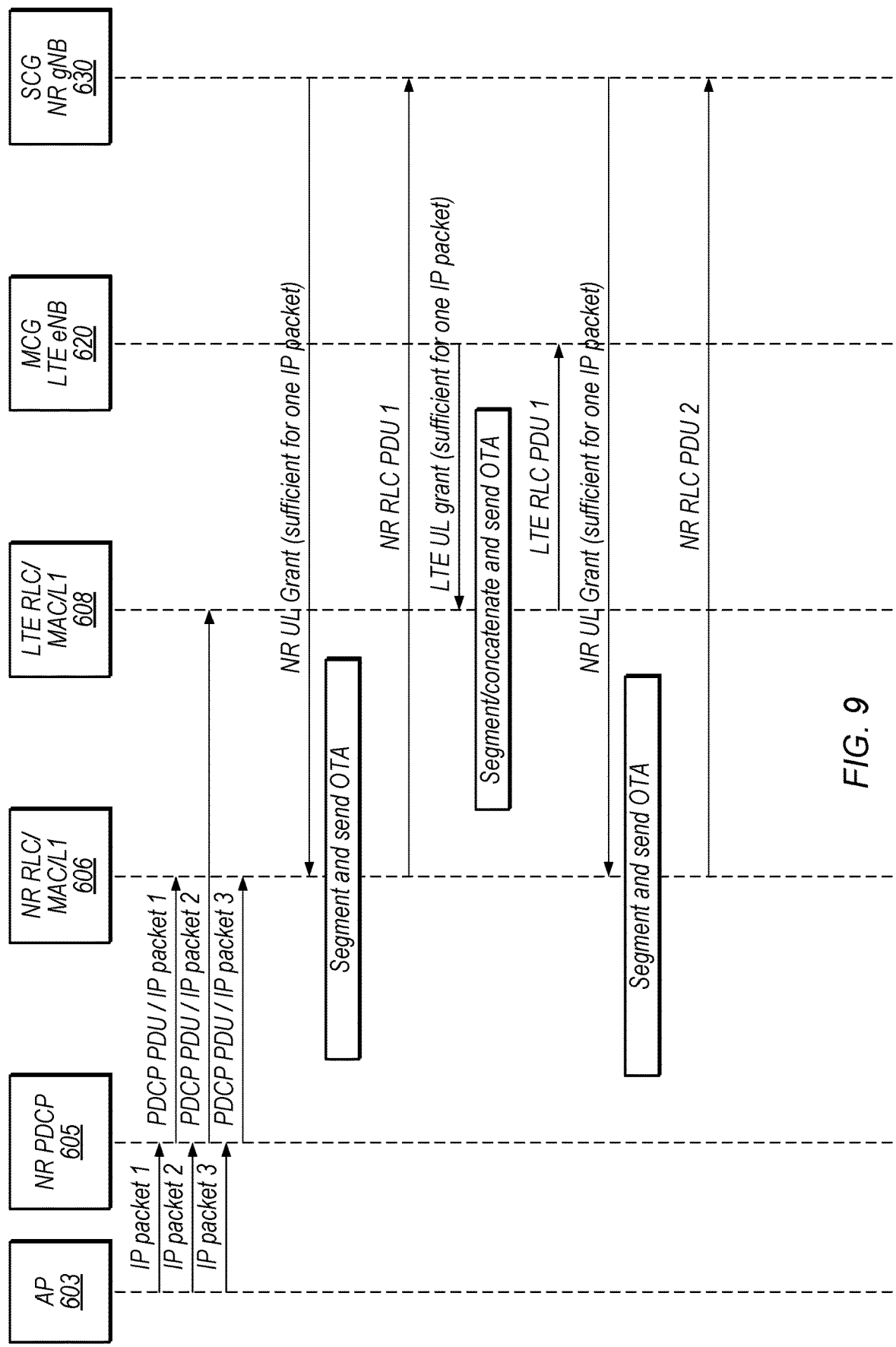
FIG. 9 is a communication diagram illustrating a technique for apportioning UL data in a round-robin fashion, according to some embodiments.

FIG. 9 is a communication diagram illustrating a technique in which a UE PDCP layer is configured to use a round-robin scheduling technique to apportion data, according to some embodiments. In some embodiments, NR PDCP entity 605 is configured, once total data volume exceeds the ulDataSplitThreshold, to submit PDCP PDUs to associated RLC links in a round-robin fashion. This may be performed at PDU granularity (e.g., submitting PDCP SN0 to LTE RLC, then submitting PDCP SN1 to NR RLC and so on). In other embodiments, the round-robin apportionment may be performed at other granularities (e.g., byte granularity, submitting PDCP SN0 (X bytes) to LTE RLC followed by submitting PDCP SN1 (Y bites) and PDCP SN2 (X minus Y bytes) to NR RLC.

In the example of FIG. 9, NR PDCP entity 605 receives IP packets 1-3 and sends them to the NR and LTE RLC layer in a round-robin fashion, with packets 1 and 3 going to NR and packet 2 going to LTE. Subsequently, when the corresponding networks provide grants, the PDUs are transmitted. In some embodiments, a round-robin implementation may provide good performance when the NR and LTE links are relatively balanced. If one link is significantly slower, however, it may constrain the faster link due to PDCP re-ordering at the receiver.

In some embodiments, the UE PDCP layer is configured to apportion data between RLC links based on theoretical maximum throughput values for the links. For example, these values may be based on physical configuration and assume maximum modulation and/or grants. The PDCP layer may then apportion based on a ratio of these throughput values. In some embodiments, UE 106 is configured to re-calculate the ratio when a link is configured, re-configured, activated, or de-activated.

For example, consider a situation where one LTE link has 5 MHz bandwidth and another LTE link has a 10 MHz bandwidth, with other parameters being similar. The PDCP entity 605 may generate a ratio of 1:2 in favor of the link with 10 MHz in this situation. This technique may provide a non-complex apportionment that addresses situations when links are relatively unbalanced. Using theoretical maximum throughputs, however, may not account for real-time conditions such as interference, congestion, far/nearness, error rates, radio link monitoring (RLM), etc.

Figure 10:
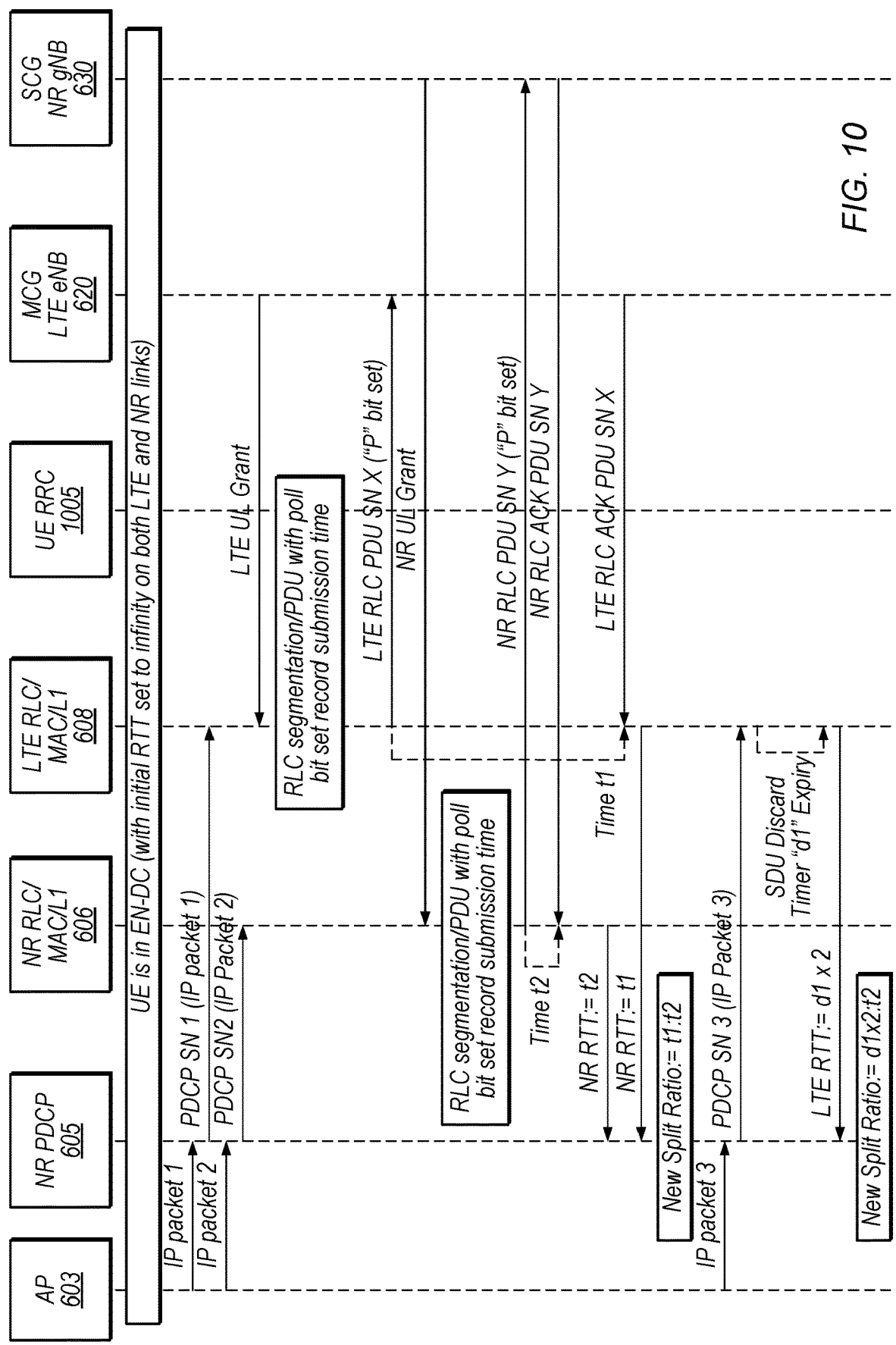
FIG. 10 is a communication diagram illustrating a technique for apportioning UL data based on RTT measurements at the RLC layer, according to some embodiments.

FIG. 10 is a communication diagram illustrating a technique in which a UE PDCP layer is configured to apportion based on dynamic round trip time (RTT) determinations at each RLC entity, in some embodiments. In some embodiments, each RLC transmission entity in a multi-connectivity link is configured to measure its individual RTT and inform the PDCP transmission entity of the current capability. An RLC entity may initialize its RTT to an initialization value such as infinity when an RLC entity is established or re-established. In some embodiments, in response to an SDU discard timer expiring, the RLC entity is configured to set its RTT to a multiplier of the discard timer (e.g., 2 times the discard timer).

NR PDCP 605, in some embodiments, is configured to maintain a current ratio of RTT between the links and apportion data based on the ratio. In some embodiments, NR PDCP 605 is configured to use a default ratio (e.g., 1:1) if either of the links is in its initialization state.

In the example of FIG. 10, the UE is in E-UTRAN New Radio—Dual Connectivity (EN-DC) mode and the initial RTTs are set to infinity (or some other initialization value) on both LTE and NR links. Note that, in other embodiments, NE-DC operation may be used in which a master RAN node is a 5G gNB and the secondary RAN node serves as a 4G ng-eNB.

In the illustrated example, NR PDCP 504 receives IP packets 1 and 2 and sends them to units 606 and 608 (e.g., using a 1:1 ratio due to initialization). In the illustrated example, the RLC entities track the respective RTT time for these two packets. In particular, a poll (P) bit is set (indicating that this PDU is not a retransmission PDU or control PDU) and the RLC layer records the submission time to the network and determines the RTT based on when the ACK is received from the network. In some embodiments, the RLC entities may be configured not to start a new RTT measurement until an outstanding measurement has completed.

In the illustrated example, the RTT t2 for packet 2 is shorter than the RTT t1 for packet 1. The RLC layer sends the RTT determinations to NR PDCP 605 which determines a new apportionment ratio t1:t2 for subsequent uplink transmissions. The remaining portion of the FIG. 10 example shows a situation with an SDU discard timer expiration, in response to which the LTE RLC layer indicates a RTT of two times the timer duration, which the PDCP uses to determine a new ratio.

In some embodiments, the RLC entities are configured to filter the RTT measurements, e.g., to average out fluctuations in individual measurements. In some embodiments, the RLC entities are configured to provide filtered RTT values to the PDCP entity periodically after an initial filtering interval.

In some embodiments, these techniques may provide real-time information for the PDCP entity and RTT may act as a proxy for overall link condition. These techniques may not, however, effectively bias against data already in RLC queues (e.g., such that RTT at RLC layer may be different than RTT experienced by PDCP entity).

In some embodiments, the UE PDCP layer is configured to determine RTT intervals itself for apportioning data. For example, PDCP entity 605 may initialize an RTT value for each link to an initial value (e.g., infinity) when the list is established or re-established. Relative to RTT determination by the RLC layer, for example, this may provide a more accurate and up to date ratio for PDCP. Further, changes to implement RTT techniques may be contained to a single protocol stack layer (PDCP), in these embodiments.

FIGS. 11A-11D are block diagrams illustrating exemplary information that may facilitate PDCP RTT determination, according to some embodiments. In some embodiments, a new or reserved PDU control type may be used to determine RTT. The PDCP entity may submit this PDU type periodically to each of the RLC entities and record the submission time. When the PDCP entity receives confirmation (e.g., from RLC layers if in acknowledged mode (AM) or from HARQ ACK), it may determine the RTT based on the time difference between submission and acknowledgement. For bearers in unacknowledged mode (UM), interspersed dual-connectivity (DC) feedback may be used to determine RTT, as discussed in further detail below. The PDCP entity may filter the RTT determinations over time. In some embodiments, if no confirmation is received from lower layers by the time of the next periodic measurement, the PDCP entity is configured to clear the submission time and mark the corresponding link as invalid for the next measurement period.

As shown in FIG. 11A, one or more reserved PDU types may be used, e.g., using the value 010 for an RTT measurement request and a value of 011 for interspersed DC feedback. The receiving peer PDCP entity may ignore control PDUs of this type once they are received.

FIG. 11B shows an exemplary new PDCP control PDU type for RTT measurement requests. In this example, the PDU includes a 4-bit RTT measurement indicator. Using four bits may provide sixteen bins in which to categorize RTT determinations. In other embodiments, any of various appropriate numbers of bits may be used. FIG. 11C shows another example of a new PDCP control PDU type that uses 12-bits (or more) to directly specify a raw RTT measurement, e.g., in milliseconds. If the measured RTT is greater than a threshold, the RTT value may be set to the threshold, for example.

FIG. 11D shows an example PDCP control PDU type for interspersed DC feedback. In this example, DC feedback may indicate the RTT measurement request confirmation to complete the RTT determination. In some embodiments, the DC feedback may also enable the EN-DC function.

Figure 12:
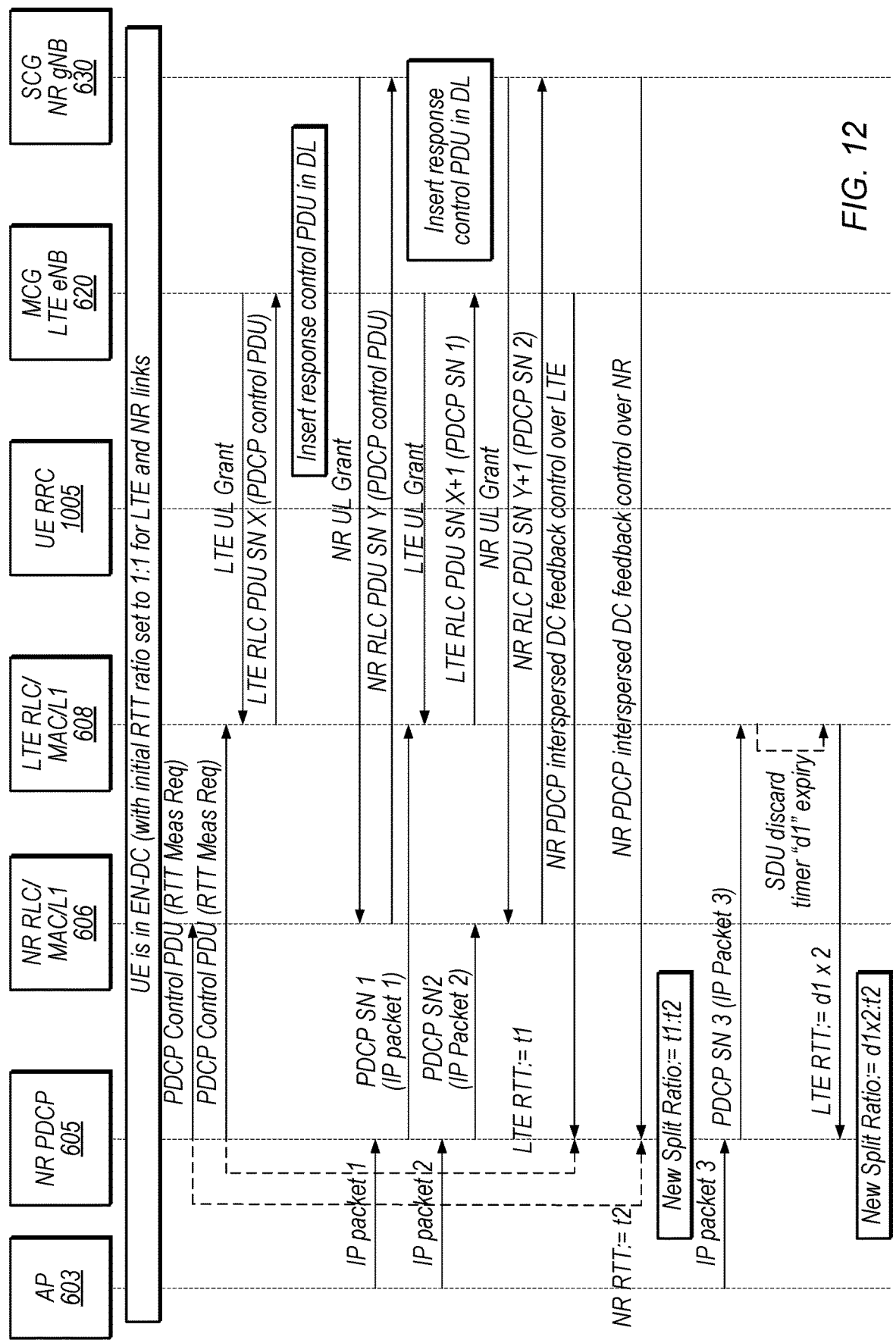
FIG. 12 is a communication diagram illustrating a technique for apportioning UL data based on RTT measurements at the PDCP layer, according to some embodiments.

FIG. 12 is a communications diagram illustrating exemplary RTT determination by the PDCP layer using interspersed DC feedback, according to some embodiments. In the illustrated example, NR PDCP entity 605 transmits PDCP control PDUs that indicate RTT measurement requests to units 606 and 608 respectively.

In response to an LTE UL grant, unit 608 sends an RLC PDU with sequence number X and the PDCP control PDU and the eNB 620 inserts a response control PDU into downlink signaling. In response to an NR UL grant, unit 606 sends an RLC PDU with sequence number Y and the PDCP control PDU to gNB 630 and the gNB 630 inserts a response control PDU into downlink signaling.

As shown, other RLC PDUs for IP packets 1 and 2 may be transmitted to the respective networks before sending feedback. When the networks send interspersed DC feedback with the response control PDUs, in the illustrated embodiment, the NR PDCP entity 605 measures the LTE RTT t1 and the NR RTT t2 based on the interval between sending the control PDU and receiving the feedback. In the illustrated example, NR PDCP entity 605 uses an apportionment ratio t1:t2 for subsequent transmissions. As shown toward the bottom of the example, the NR PDCP entity 605 may set a RTT to a multiple of an SDU discard timer interval in response to timer expiration.

In some embodiments, the UE PDCP layer is configured to apportion data based on RLC link performance. In some embodiments, the UE PDCP entity is configured to monitor performance on one or more of the available links (e.g., the ratio of ACKs to NACKs over a time period, the number of NACKs over a time period, or some other metric). In some embodiments, multiple thresholds may be defined based on the monitored performance and the UE PDCP may select an SN gap limit based on which threshold is met. For example, an array of SN gap values may be defined along with relationships between performance thresholds and array entries. Speaking generally, links with good performance may be allowed a larger SN gap, e.g., because they are estimated to be likely to overcome the gap quickly rather than slowing down other links.

The UE PDCP entity may then send PDUs based on the SN gap limit. For example, SNs starting at N may be sent over one link and then SNs starting at N+(SN gap limit)−1 may be send over the other link. This is a token-based approach to implement an SN gap limit in which the number of tokens that each link obtains for its turn is based on its monitored performance, but other techniques may be used in other embodiments. In some embodiments, when switching from one SN gap limit to another, the PDCP entity may monitor for a threshold time interval to ensure that the improved or worsened performance continues before changing. An SN gap limit is one exemplary technique for implementing an apportionment ratio, but other techniques may also be used with the various embodiments disclosed herein.

In some embodiments, the UE PDCP layer is configured to apportion data based on cross-layer link parameters, in some embodiments. In some embodiments, these parameters may be used in combination with other parameters discussed herein, e.g., to select an SN gap limit or an apportionment ratio.

Current RLC data volume is one example parameter (which may be filtered, measured over a relevant time interval, etc.). Uplink grant and resource availability on each link is another example parameter. Priority of data packets being submitted to lower layers by the PDCP transmission entity is another example parameter (note that priority may be used to override other balancing considerations, in some embodiments, or even to send redundant PDUs on multiple links for high priority data). Reliability of each of the links is another example parameter and may be determined, for example, based on L1 HARQ characteristics, L2 RLC ARQ characteristics, and/or coexistence characteristics (e.g., the level to which a link is successfully coexisting with other wireless communications such as WLAN communications). Transmit power per bit of each of the links is another example parameter. Link bandwidth and theoretical maximum achievable throughput for each link are also example parameters. One or more of these input parameters may be combined to determine ratios/tokens/SN gaps, etc. for apportioning data at the PDCP layer, in various embodiments. Some of these parameters may require the PDCP layer to communicate with other layers to determine values for the input parameters.

Figure 13:
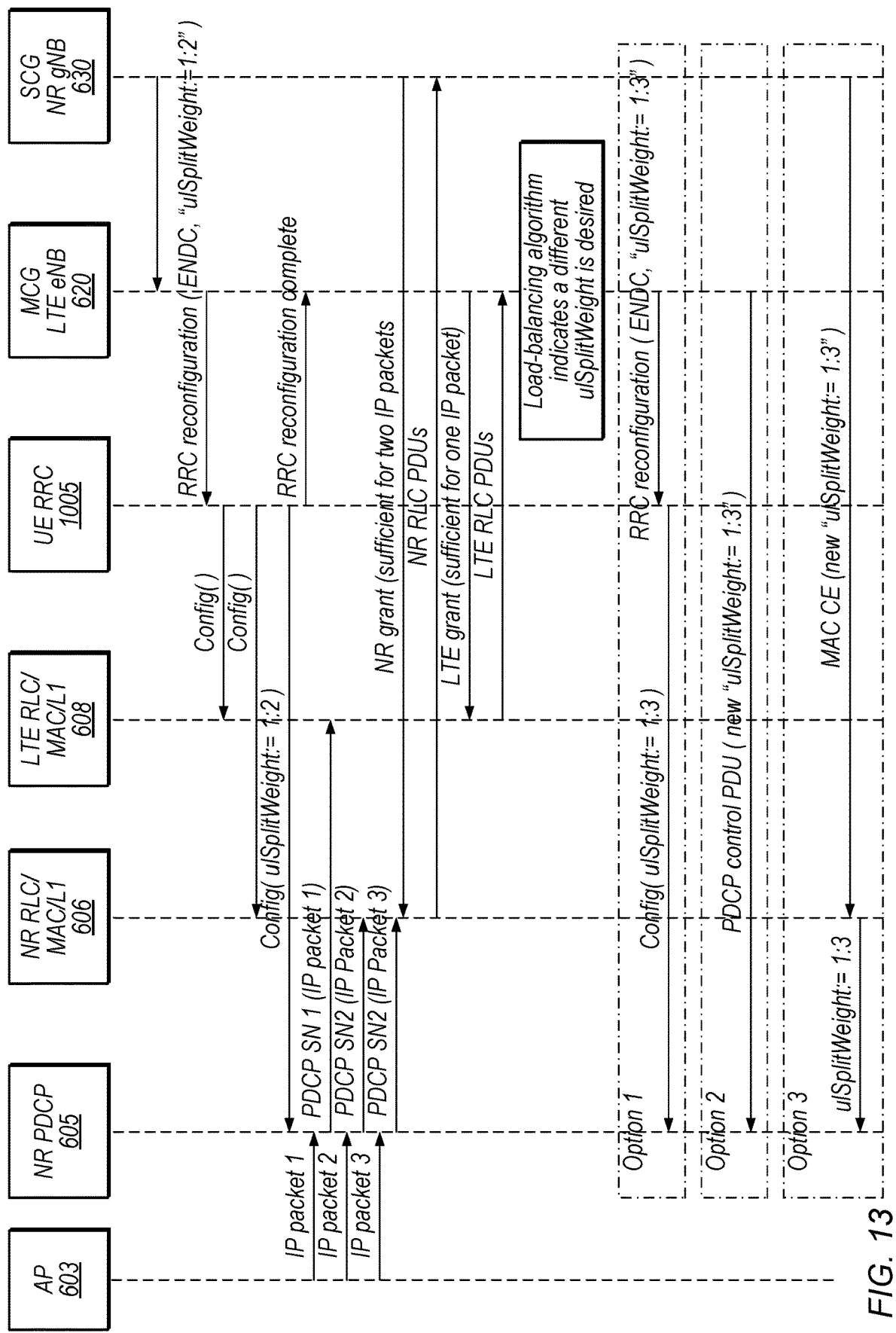
FIG. 13 is a communication diagram illustrating a technique for apportioning UL data based on a network-specified ratio, according to some embodiments.

FIG. 13 is a communication diagram illustrating a technique in which a UE PDCP layer is configured to apportion data based on information specified by the network, according to some embodiments. In some embodiments, the network is configured to determine a value (e.g., a weight ratio) for each associated RLC link for the UE PDCP transmission entity to use for UL apportionment. The network may determine the ratio based on scheduling constraints, for example, which may facilitate load balancing. Other parameters that may be considered by the network in load balancing may include: channel conditions reported by the UE (e.g., as part of UL measurement reports), instantaneous scheduling load on UL shared channels such as PUSCH, quality of service (QoS) guarantees negotiated between the UE and a network during initial bearer setup, cell capacity, etc.

The network may send this information to the UE via RRC signaling, a PDCP control PDU, or a MAC control element (CE), for example. RRC signaling may be semi-static with a relatively higher latency while the other two examples may be adaptive and dynamic, with a relatively lower latency.

In the example of FIG. 13, the gNB 630 indicates a ulSplitWeight ratio of 1:2 in an RRC reconfiguration message to the UE RRC 1005. The RRC entity then configures units 606 and 608, as well as indicating the ratio to the PDCP entity 605. The NR PDCP entity 605 then sequences and assigns IP packets based on the indicated ratio. In response to a load-balancing algorithm at eNB 620 indicating that a different ratio is desired, FIG. 13 shows three example options for indicating the new ratio to NR PDCP entity 605, e.g., via RRC reconfiguration, an PDCP control PDU, or a MAC CE.

Figure 14:
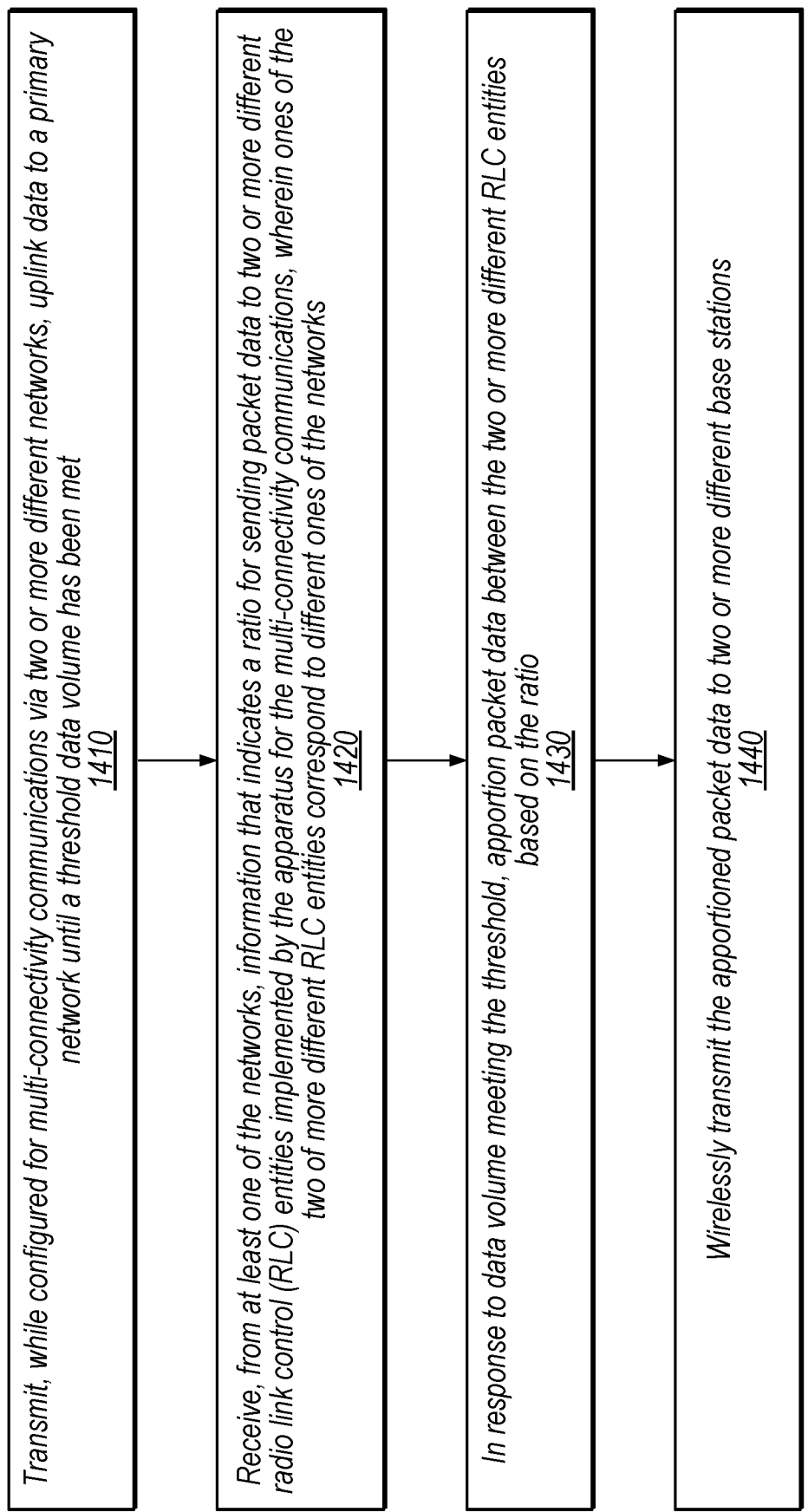
FIG. 14 is a flow diagram illustrating an example method performed by a mobile device, according to some embodiments.

FIG. 14 is a flow diagram illustrating an example method, according to some embodiments. Note that the UE-side techniques of FIG. 13 are one example of the method shown in FIG. 14. The method shown in FIG. 14 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1410, in the illustrated embodiment, a mobile device transmits, while configured for multi-connectivity communications via two or more different networks, uplink data to a primary network until a threshold data volume has been met.

At 1420, in the illustrated embodiment, the mobile device receives, from at least one of the networks, information that indicates a ratio for sending packet data to two or more different radio link control (RLC) entities implemented by the apparatus for the multi-connectivity communications, wherein ones of the two of more different RLC entities correspond to different ones of the networks.

At 1430, in the illustrated embodiment, in response to data volume meeting the threshold, the mobile device apportions packet data between the two or more different RLC entities based on the ratio.

At 1430, in the illustrated embodiment, the mobile device wirelessly transmits the apportioned packet data to two or more different base stations.

Figure 15:
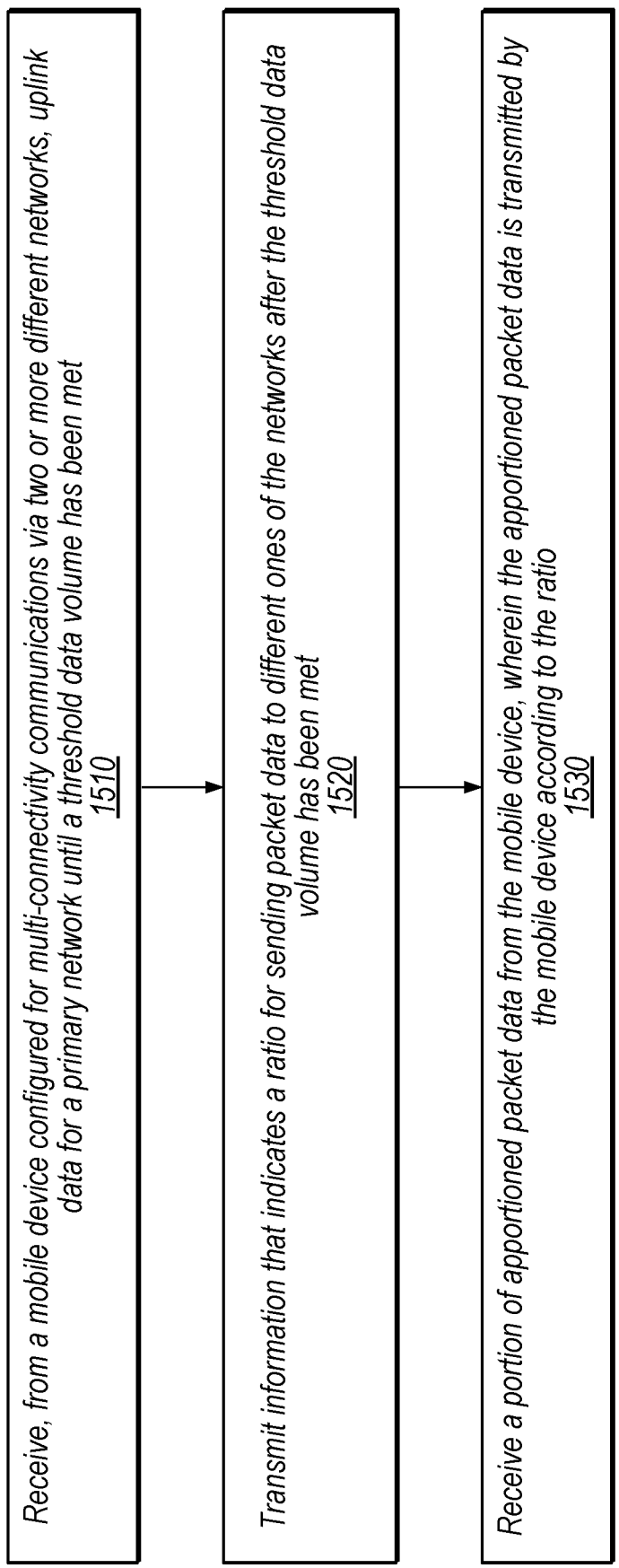
FIG. 15 is a flow diagram illustrating an example method performed by a base station, according to some embodiments.

FIG. 15 is a flow diagram illustrating another example method, according to some embodiments. Note that the base station-side techniques of FIG. 13 are one example of the method shown in FIG. 15. The method shown in FIG. 15 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1510, in the illustrated embodiment, a base station receives from a mobile device configured for multi-connectivity communications via two or more different networks, uplink data for a primary network until a threshold data volume has been met.

At 1520, in the illustrated embodiment, the base station transmits information that indicates a ratio for sending packet data to different ones of the networks after the threshold data volume has been met. The base station may determine the ratio using a load-balancing algorithm for example.

At 1530, in the illustrated embodiment, the base station receives a portion of apportioned packet data from the mobile device, where the apportioned packet data is transmitted by the mobile device according to the ratio.

Note that the various apportionments discussed herein may be used in combination or at different times by the same device (e.g., in different modes of operation). Further, although LTE and NR are discussed herein, similar techniques may be applied to any of various combinations of networks. Further, the protocol layers discussed herein are included for illustration but are not intended to limit the scope of the present disclosure to those particular layers. For example, functionality described as being performed by the PDCP layer may be performed at other layers, in various embodiments.

As used herein, the term "module" refers to circuitry configured to perform specified operations or to physical non-transitory computer readable media that store information (e.g., program instructions) that instructs other circuitry (e.g., a processor) to perform specified operations. Thus, modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 16:
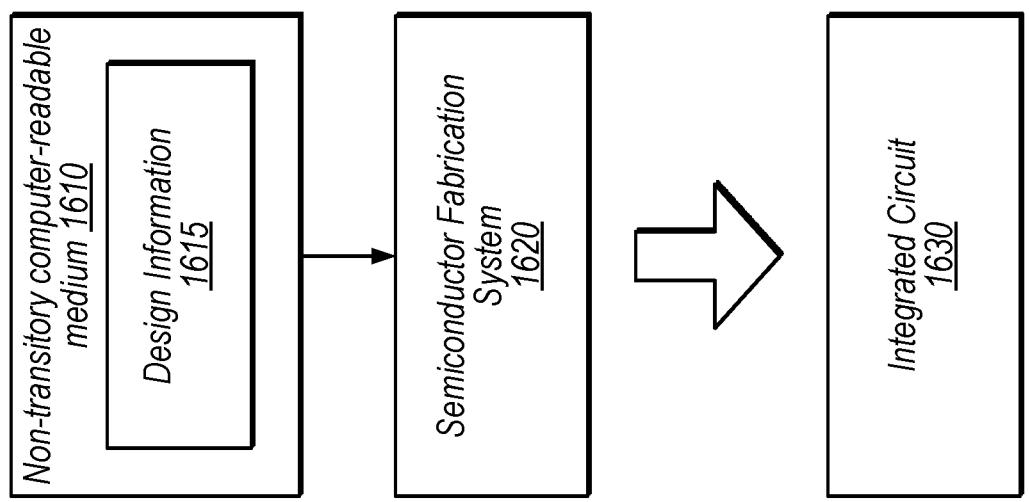
FIG. 16 is a block diagram illustrating an example computer-readable medium that stores design information for an integrated circuit, according to some embodiments.

FIG. 16 is a block diagram illustrating an example non-transitory computer-readable storage medium that stores circuit design information, according to some embodiments. In the illustrated embodiment semiconductor fabrication system 1620 is configured to process the design information 1615 stored on non-transitory computer-readable medium 1610 and fabricate integrated circuit 1630 based on the design information 1615.

Non-transitory computer-readable storage medium 1610, may comprise any of various appropriate types of memory devices or storage devices. Non-transitory computer-readable storage medium 1610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1610 may include other types of non-transitory memory as well or combinations thereof. Non-transitory computer-readable storage medium 1610 may include two or more memory mediums which may reside in different locations, e.g., in different computer systems that are connected over a network.

Design information 1615 may be specified using any of various appropriate computer languages, including hardware description languages such as, without limitation: VHDL, Verilog, SystemC, SystemVerilog, RHDL, M, MyHDL, etc. Design information 1615 may be usable by semiconductor fabrication system 1620 to fabricate at least a portion of integrated circuit 1630. The format of design information 1615 may be recognized by at least one semiconductor fabrication system 1620. In some embodiments, design information 1615 may also include one or more cell libraries which specify the synthesis and/or layout of integrated circuit 1630. In some embodiments, the design information is specified in whole or in part in the form of a netlist that specifies cell library elements and their connectivity. Design information 1615, taken alone, may or may not include sufficient information for fabrication of a corresponding integrated circuit. For example, design information 1615 may specify the circuit elements to be fabricated but not their physical layout. In this case, design information 1615 may need to be combined with layout information to actually fabricate the specified circuitry.

Integrated circuit 1630 may, in various embodiments, include one or more custom macrocells, such as memories, analog or mixed-signal circuits, and the like. In such cases, design information 1615 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1620 may also be configured to perform various testing of fabricated circuits for correct operation.

In various embodiments, integrated circuit 1630 is configured to operate according to a circuit design specified by design information 1615, which may include performing any of the functionality described herein. For example, integrated circuit 1630 may include any of various elements shown in FIGS. 3-7A. Further, integrated circuit 1630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Figure 17:
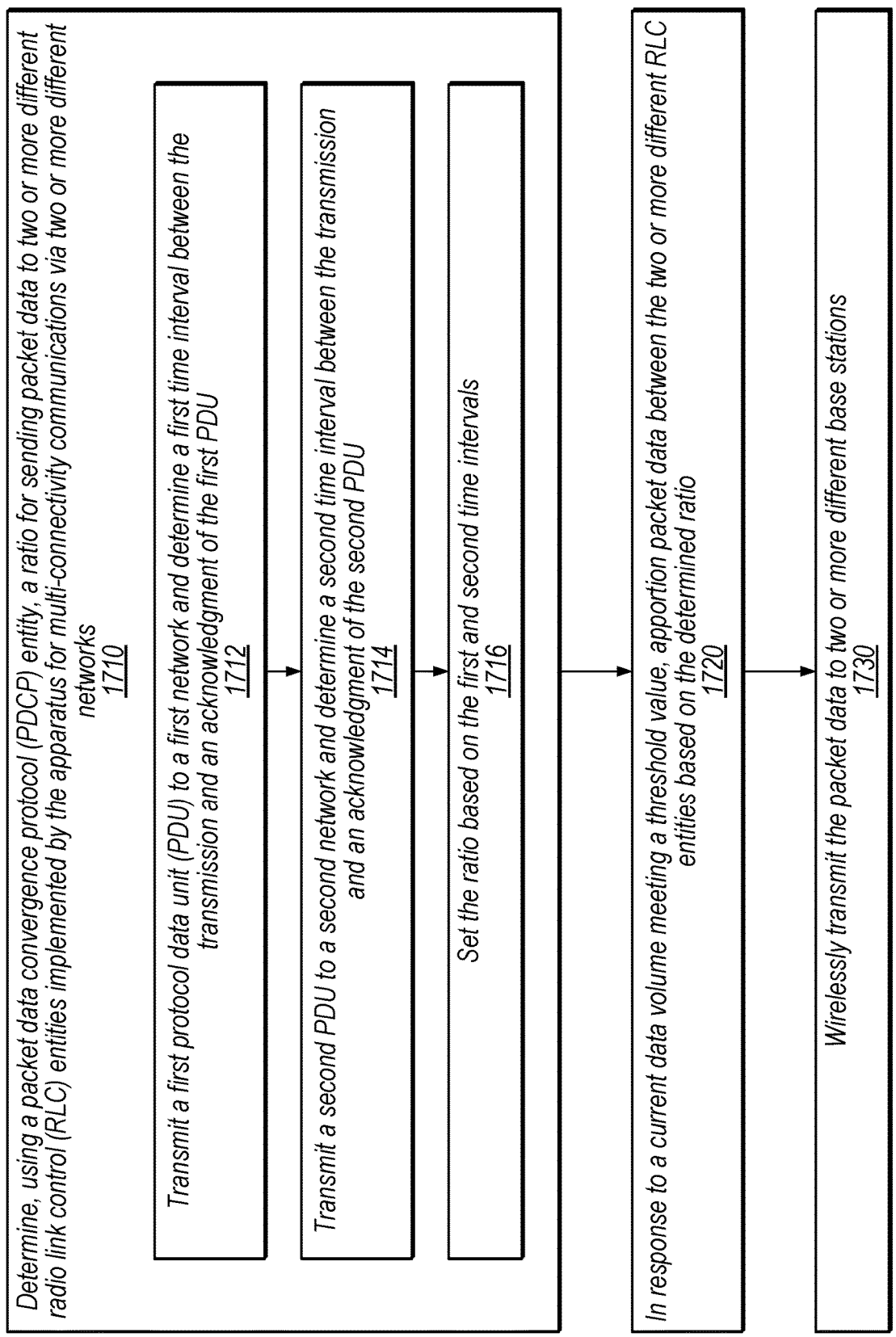
FIG. 17 is a flow diagram illustrating another example method performed by a mobile device, according to some embodiments.

FIG. 17 is a flow diagram illustrating an example method, according to some embodiments. Note that the UE-side techniques of FIG. 10 are one example of the method shown in FIG. 17. The method shown in FIG. 17 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1710, in the illustrated embodiment, a device (e.g., a UE) determines, using a packet data convergence protocol (PDCP) entity, a ratio for sending packet data to two or more different radio link control (RLC) entities implemented by the apparatus for multi-connectivity communications via two or more different networks. In the illustrated embodiment, the determining includes method elements 1712-1716.

At 1712, in the illustrated embodiment, the device transmits a first protocol data unit (PDU) to a first network and determine a first time interval between the transmission and an acknowledgment of the first PDU.

At 1714, in the illustrated embodiment, the device transmits a second PDU to a second network and determine a second time interval between the transmission and an acknowledgment of the second PDU. The first and second PDUs may be RLC PDUs transmitted to respective base stations of the first and second networks. The first and second PDUs may be PDCP PDUs, which may have a type indicating a RTT measurement request (e.g., "010" in the example of FIG. 11A). The first and second PDUs may have a field configured to encode a round-trip-time determination (e.g., the RTT measurement fields of FIG. 11B or 11C). In some embodiments, the acknowledgments of the first and second PDUs are included in interspersed feedback control PDUs, e.g., as shown in FIG. 11D.

At 1716, in the illustrated embodiment, the device sets the ratio based on the first and second time intervals.

At 1720, in the illustrated embodiment, in response to a current data volume meeting a threshold value, the device apportions packet data between the two or more different RLC entities based on the determined ratio. In some embodiments, the apportioning uses different sequence number (SN) gap limits for two or more different networks.

At 1730, in the illustrated embodiment, the device wirelessly transmits the packet data to two or more different base stations.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processors; and
one or more memories having instructions stored thereon that are executable by the one or more processors to:
determine, using a packet data convergence protocol (PDCP) entity, a ratio for sending packet data to two or more different radio link control (RLC) entities implemented by the apparatus for multi-connectivity communications via two or more different networks, wherein to determine the ratio, the one or more processors are configured to:
transmit a first protocol data unit (PDU) to a first network and determine a first time interval between the transmission and an acknowledgment of the first PDU;
transmit a second PDU to a second network and determine a second time interval between the transmission and an acknowledgment of the second PDU; and
set the ratio based on the first and second time intervals;
in response to a current data volume meeting a threshold value, apportion packet data between the two or more different RLC entities based on the determined ratio, wherein the apportioning uses different sequence number token values for two or more different networks, wherein the sequence number token values indicate a threshold number of consecutive sequence numbers assignable to a given network before switching to assigning sequence numbers to another network such that the switch occurs before reaching a sequence number corresponding to the sum of an initial sequence number in a sequence assigned to the given network and a current sequence number token value for the given network; and
wirelessly transmit the packet data to two or more different base stations.

2. The apparatus of claim 1, wherein the first and second PDUs are RLC PDUs transmitted to respective base stations of the first and second networks.

3. The apparatus of claim 1, wherein the first and second PDUs are PDCP PDUs.

4. The apparatus of claim 3, wherein the first and second PDUs have a PDU type indicating a round-trip-time measurement request.

5. The apparatus of claim 3, wherein the first and second PDUs have a field configured to encode a round-trip-time determination.

6. The apparatus of claim 3, wherein the acknowledgment of the first PDU and the acknowledgment of the second PDU are included in interspersed feedback control PDUs.

7. The apparatus of claim 1, wherein the ratio is further based on a number of ACKs and NACKs on each of the first and second networks.

8. The apparatus of claim 1, wherein the apportioning uses a greater sequence number token value for the second network based on the second time interval being shorter than the first time interval.

9. The apparatus of claim 1, wherein the ratio is further based on link quality metrics associated with multiple different communication layers.

10. The apparatus of claim 9, wherein the link quality metrics include one or more of:
current RLC data volume on different networks;
uplink grant availability on different networks;
resource availability on different networks;
priority of data packets;
HARQ characteristics for different networks;
ARQ characteristics for different networks;
co-existence characteristics for different networks;
power per bit for different networks;
bandwidth for different networks;
theoretical maximum achievable throughput for different networks; or
quality of service negotiated for data radio bearers (DRBs).

11. A method, comprising:
receiving, by a base station from a mobile device configured for multi-connectivity communications via two or more different networks, uplink data for a primary network until a threshold data volume has been met;

receiving a first protocol data unit (PDU) from the mobile device and sending an acknowledgment of the first PDU;

receiving, after the threshold data volume has been met, a portion of apportioned packet data from the mobile device based on a ratio, wherein the ratio is determined by the mobile device based on a first time interval between the transmission and receipt of acknowledgment of the first PDU;

transmitting a second PDU to another network and determining a second time interval between the transmission and an acknowledgment of the second PDU; and setting the ratio based on the first and second time intervals, wherein the apportionment based on the ratio is based on different sequence number token values for two or more different networks, wherein the sequence number token values indicate a threshold number of consecutive sequence numbers assignable to a given network before switching to assigning sequence numbers to another network such that the switch occurs before reaching a sequence number corresponding to the sum of an initial sequence number in a sequence assigned to the given network and a current sequence number token value for the given network.

12. The method of claim 11, further comprising:
encoding a round-trip-time interval in a field of a feedback PDU based on the first PDU.

13. The method of claim 11, wherein the first and second PDUs have a PDU type indicating a round-trip-time measurement request.

14. The method of claim 11, further comprising transmitting, to the mobile device, information indicating one or more of:
uplink grant availability;
resource availability;
co-existence characteristics; or
quality of service negotiated for data radio bearers (DRBs).

15. An apparatus, comprising:
one or more processors configured to:
receive, from a mobile device configured for multi-connectivity communications via two or more different networks, uplink data for a primary network until a threshold data volume has been met;
receive a first protocol data unit (PDU) from the mobile device and send an acknowledgment of the first PDU;
receive, after the threshold data volume has been met, a portion of apportioned packet data from the mobile device based on a ratio, wherein the ratio is determined by the mobile device based on a first time interval between the transmission and receipt of acknowledgment of the first PDU;
transmit a second PDU to another network and determine a second time interval between the transmission and an acknowledgment of the second PDU; and
set the ratio based on the first and second time intervals, wherein the apportionment based on the ratio is based on different sequence number token values for two or more different networks, wherein the sequence number token values indicate a threshold number of consecutive sequence numbers assignable to a given network before switching to assigning sequence numbers to another network such that the switch occurs before reaching a sequence number corresponding to the sum of an initial sequence number in a sequence assigned to the given network and a current sequence number token value for the given network.

16. The apparatus of claim 15, wherein the one or more processors are further configured to:
encode a round-trip-time interval in a field of a feedback PDU based on the first PDU.

17. The apparatus of claim 15, wherein the first and second PDUs have a PDU type indicating a round-trip-time measurement request.

18. The apparatus of claim 15, wherein the one or more processors are further configured to:
transmit, to the mobile device, information indicating one or more of:
uplink grant availability;
resource availability;
co-existence characteristics; or
quality of service negotiated for data radio bearers (DRBs).

19. The apparatus of claim 15, wherein the ratio is further based on link quality metrics associated with multiple different communication layers.

20. The apparatus of claim 19, wherein the link quality metrics include one or more of:
current RLC data volume on different networks;
uplink grant availability on different networks;
resource availability on different networks;
priority of data packets;
HARQ characteristics for different networks;
ARQ characteristics for different networks;
co-existence characteristics for different networks;
power per bit for different networks;
bandwidth for different networks;
theoretical maximum achievable throughput for different networks; or
quality of service negotiated for data radio bearers (DRBs).

* * * * *